United States Patent [19]

Purcell

[11] Patent Number: 5,109,141
[45] Date of Patent: Apr. 28, 1992

[54] DIGITIZER STYLUS WITH Z-AXIS SIDE CONTROL

[75] Inventor: Alexander M. Purcell, Wallingford, Conn.

[73] Assignee: Summagraphics Corporation, Seymour, Conn.

[21] Appl. No.: 559,425

[22] Filed: Jul. 23, 1990

Related U.S. Application Data

[63] Continuation-in-part of Ser. No. 436,196, Nov. 13, 1989, Pat. No. 5,004,871.

[51] Int. Cl.⁵ ............................................. G08C 21/00
[52] U.S. Cl. ...................................................... 178/18
[58] Field of Search ............................... 178/18, 19, 20

[56] References Cited

U.S. PATENT DOCUMENTS

| | | |
|---|---|---|
| 294,263 | 2/1988 | Rodgers et al. . |
| 3,462,548 | 8/1969 | Rinder . |
| 3,528,295 | 11/1970 | Johnson et al. . |
| 4,263,592 | 4/1981 | Takahashi et al. . |
| 4,491,688 | 1/1985 | Schaub et al. . |
| 4,532,376 | 7/1985 | Rockwell . |
| 4,542,261 | 9/1985 | Behnke . |
| 4,580,007 | 4/1986 | Searby et al. . |
| 4,638,119 | 1/1987 | Blesser et al. . |
| 4,654,648 | 3/1987 | Herrington et al. . |
| 4,672,154 | 6/1987 | Rodgers et al. . |
| 4,695,680 | 9/1987 | Kable . |
| 4,697,050 | 9/1987 | Ford et al. ........................... 178/18 |
| 4,704,501 | 11/1987 | Taguchi et al. . |
| 4,707,571 | 11/1987 | Clements et al. . |
| 4,786,764 | 11/1988 | Padula et al. . |
| 4,786,765 | 11/1988 | Yamanami et al. . |
| 4,806,707 | 2/1989 | Landmeier . |

Primary Examiner—Stafford D. Schreyer
Attorney, Agent, or Firm—Rosen, Dainow & Jacobs

[57] ABSTRACT

Stylus for digitizer tablet, with the stylus provided with a finger-actuated side control for controlling the magnitude of a Z-axis signal. The side control remains in the position placed by the user, and preferably comprises a slide switch mounted on the side of the stylus housing.

14 Claims, 2 Drawing Sheets

DIGITIZER STYLUS WITH Z-AXIS SIDE CONTROL

RELATED APPLICATION

This application is a continuation-in-part of my prior filed application, Ser. No. 07/436,196, filed Nov. 13, 1989 U.S. Pat. No. 5004871.

BACKGROUND OF INVENTION

This invention relates to a stylus for use with a digitizer tablet or like apparatus, and in particular such a stylus provided with a side control for generating what is known as a Z-axis signal.

In my prior co-pending application, Ser. No. 07/436,196, whose contents are hereby incorporated by reference, I describe and claim a stylus having an analog side switch, operable by the user, to provide an output signal which continuously varies over a given range in response to user-applied pressure or force. As is well known, a stylus in cooperation with a conventional digitizer tablet generates signals representing X-Y coordinate pairs of the location of the stylus with respect to the tablet working surface. It was also known to provide a pressure-responsive transducer, inside the stylus housing, coupled to the stylus tip. The user, by controlling the stylus tip pressure on the tablet, could also cause the outputting of a Z-axis signal which, depending upon the tablet electronics and software, could be interpreted as, for example, the width or color or other attribute of a line, or as the dimension of a screen object in the Z-direction. My prior application describes use of a finger-actuated stylus side control coupled to a Hall-effect transducer for controlling the magnitude of the Z-axis signal.

SUMMARY OF INVENTION

The present invention describes an additional embodiment of a stylus Z-axis analog output side control. This additional embodiment differs from the side control described in my prior application in that the Z-axis signal output produced when the user actuates the control to a new position remains constant and does not change even though the user removes his hand from the side control.

In my earlier disclosed side control, the actuator was a button on the stylus which was spring-biased outwards to a first end position. The user could depress the button against the spring action to vary the Z-axis signal, but, when the user released the button, the actuator returned to its end position and the Z-axis signal was returned to its initial condition. In my present invention, the actuator for the side control retains the position it is moved to by the user. Hence, the Z-axis signal output remains at the same level irrespective of whether the user applies pressure to the actuator or even continues to hold the stylus. This capability may be important to graphic artists doing certain kinds of drawings or sketches where it is desired to maintain a certain line or area attribute for extended periods of time or even over several sessions.

In accordance with a further aspect of the invention, the side control is a slide switch mounted on the side of the stylus housing. It is preferred that the slide switch is movable longitudinally of the stylus. While the slide switch can also be configured to move circumferentially, the means to implement such a configuration would be complex and expensive. In contrast, a longitudinally-movable slide switch is relatively easy to integrate into current stylus configurations.

In accordance with still another aspect of the invention, the Z-axis signal output is varied using a resistive element. Preferably, inside of the stylus housing is mounted a resistive element, preferably as a bifurcated resistance strip having end terminals for applying a voltage or current across the strips. Coupled to the bottom of the slide switch is a conductive member which is biased into contact with both elements of the bifurcated strip. The location of the slide conductive member across the bifurcated strip thus determines the resistance seen at the end terminals. As the user slides the switch the resistance changes, and this resistance change can be used to attenuate the Z-axis output signal.

SUMMARY OF DRAWINGS

The invention will now be illustrated by way of example in connection with preferred embodiments of the invention, taken in conjunction, with the accompanying drawings wherein.

DETAILED DESCRIPTION OF PREFERRED EMBODIMENTS

For more details on the application and use of a digitizer stylus with a Z-axis signal generating control, reference is made not only to my copending application, but also to a commonly-assigned U.S. Pat. No. 4,786,764 by Padula et al. With this background, the remainder of this description need be concerned only with the construction of the side control of this invention and its mounting on the stylus. For this purpose, it is assumed that the stylus contains the usual components (such as an induction coil) for sensing its location over the tablets' working surface, a spring-loaded refill element, as it is commonly called, whose tip protrudes from the front of the stylus body, and the usual on-off switch activated by the pressed tip which generates a signal typically used to command the tablet electronics to output X and Y coordinate and the Z analog signals. A cable typically connects the electrical components inside the stylus to the tablet electronics.

Figure 1:
FIG. 1 is a side view of one form of stylus with a side control in accordance with the invention.
Figure 2:
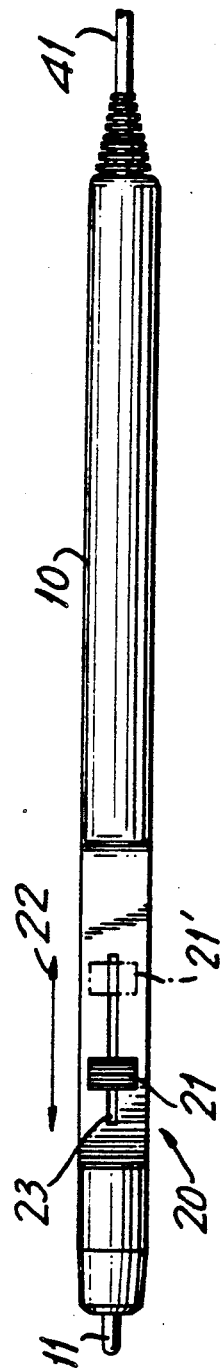
FIG. 2 is a top view of the stylus of FIG. 1.
Figure 3:
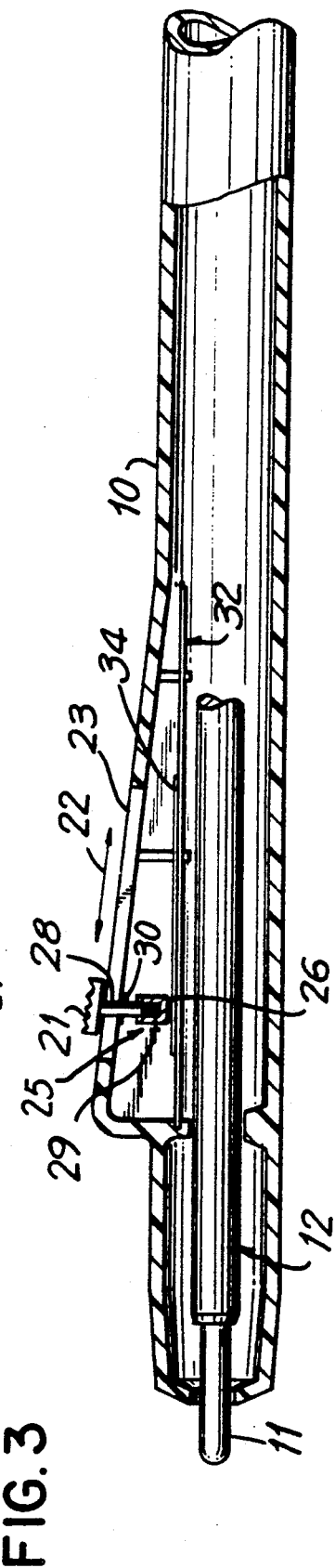
FIG. 3 is a partial cross-sectional view of the stylus showing the interior construction of the slide switch.

FIGS. 1 and 2 are side and top views, respectively, of a stylus in accordance with the invention. The stylus parts that are conventional include an elongated housing 10, usually of plastic, which contains at one end a stylus tip 11. Not shown in FIGS. 1 and 2 is the usual induction coil located at the stylus left end, surrounding the tip 11, for a stylus to interact with an electromagnetic type of digitizer tablet. See for example Davis U.S. Pat. No. 4,368,352, whose contents are hereby incorporated by reference, and the patents referenced in the Davis specification for a more detailed description of the electronics and operation of a digitizer tablet. The tip 11 is the pointing end of a so-called refill element 12 (see FIG. 3) which extends longitudinally inside the housing 10. Not shown but conventional in current styluses is the mounting of the refill 12 which allows for longitudinal movement of the refill 12 in the axial (longitudinal) direction of the stylus. Also not shown and equally conventional is an on-off switch mounted inside the housing 10 in a position to be actuated when the user presses the stylus tip against the tablet's working surface. Operation of the switch is a command to the tablet electronics to start outputting the X/Y coordinates of the stylus with respect to the active tablet surface area. When the user removes the stylus tip pressure, the switch is deactivated. This operation is similar to a stylus with a so-called button switch on the stylus side, actuated by a finger of the user, to selectively render the stylus active and inactive.

In this embodiment of the invention, the tablet electronics is also generating a so-called Z-axis signal, i.e., a signal separate from the X/Y location data and useful for other purposes, such as providing varying line widths, density or color. The stylus of the invention provides a side control 20 on the stylus housing for user-control of the Z-axis signal intensity, magnitude, or any other signal property desired.

In the preferred embodiment, the side control 20 is a slide switch having a user-actuated movable slide key 21 that is movable in the longitudinal direction (shown by the double-ended arrow 22) of the stylus along a slot 23 extending along the side of the housing.

The slide key 21 is connected to and actuates a cup-shaped member 25 having an electrically conductive contact surface 26, for example of graphite or phosphor-bronze. The actuating means includes a rod 28 depending from the slide key whose free end engages a compression spring 29 seated in the cup-shaped member 25. A cross-rod 30 attached to the rod 28 retains the slide key 21 on the housing 10. The spring 29 biases the slide key 21 outwardly and the cross-rod 30 is pressed against the underside of the wall containing the slot 23. This pressure provides a friction force which maintains the slide key 21 in any position placed by the user along the slot 23. To move the key 21, the user presses down on the slide key, which relieves the frictional engagement and allows the user to freely slide the key 21 to a different position, shown at 21' in dashed lines in FIGS. 1 and 2.

Figure 4:
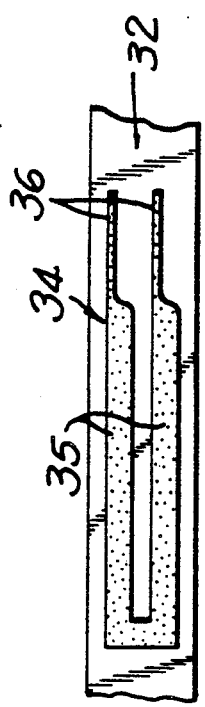
FIG. 4 is a plan view of a bifurcated resistance strip for use with the embodiment of FIG. 3.

Mounted within the housing 10 under the side control 20 is a printed circuit board 32 and on the latter is printed a resistive element 34. In a preferred embodiment, the resistive element 34 is a bifurcated linear resistive element, of which a plan view is shown in FIG. 4. As will be observed, the resistive element 34, which can be a thick or thin resistive film, has a generally U-shape with parallel resistive spaced sides or less connected to terminal ends 36. The contact surface 36 at the bottom of the slide key has a width sufficient to bridge and contact both legs 35 of the U 34. The spring 29 pressure maintains a good contact. It will be evident that the longitudinal position of the slide key determines the overall resistance seen or measured across the end terminals 36. The configuration functions the same as a rheostat or variable resistance potentiometer. Such linear resistive elements are readily available in the form shown from well-known suppliers such as Waters Manufacturing, Inc., in various materials, and will provide repeatable resistance values with very high accuracy.

Figure 5:
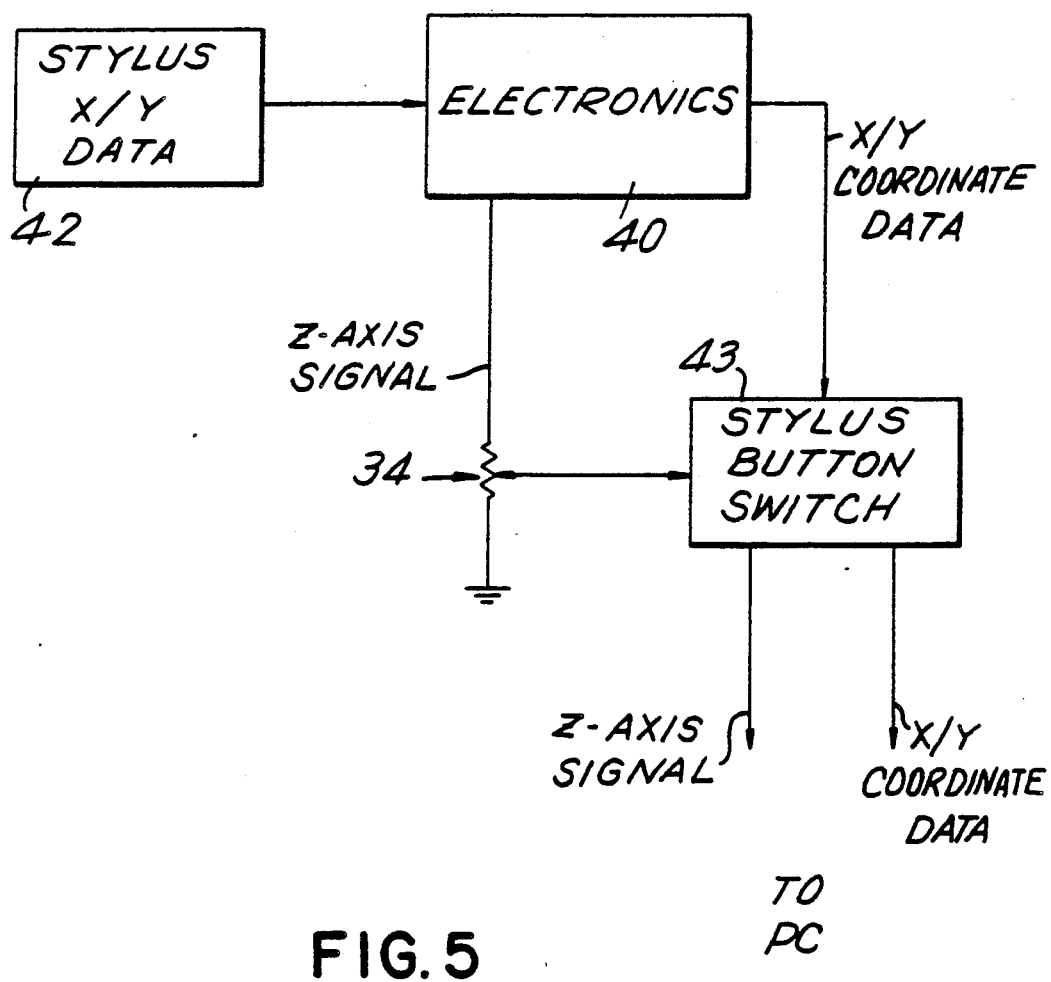
FIG. 5 is a block circuit diagram of the electronics for a tablet with the stylus of FIG. 1.

FIG. 5 schematically illustrates a typical circuit. The tablet electronics 40 is typically housed within the tablet, which is connected by way of a cable 41 to the stylus. The stylus generates X/Y data 42 which is sent to and processed by the electronics. The processed X/Y data output is then inputted to a switch 43 controlled by user pressure on the tip 11 or by a separate button on the housing. The electronics also generates a high intensity Z-axis signal which is coupled via the variable resistance 34 also to the stylus button switch 43. When the button switch 43 is activated, the signals are sent to a PC or other computer for processing. The user's actuation of the slide key 21 varies the resistance of the resistive element and thus allows the Z-axis signal to be varied between maximum and minimum values.

The invention is not limited to a variable resistance for modifying the Z-axis signal. Other kinds of interactions performing the equivalent function could be readily substituted, such as an LED/photodetector combination, with the slide key actuating a light barrier with a widening opening for controlling the amount of light passing to the photodetector. Similarly, the invention is not limited to a linear resistance element. For some applications, a non-linear variable element would be preferred, providing fine control at one end of the range and coarse control at the opposite end.

A side control stylus in accordance with the present invention, like that of the copending application, is not subject to unwanted changes of pressure because of wrist and arm movements required to activate conventional switches and is substantially not affected by pressing on varying surface textures. A movable element that slides longitudinally as disclosed herein, provides stability for various positions of the switch.

In summary, the Z-axis output of the side control of the invention may be supplied to digitizer or like apparatus via cable harness or wireless, and may be used to control the magnitude of a voltage or signal for a variety of functions, including coloring or shading, line intensity, Z-axis control, etc. In the preferred embodiment, the side control is used to control gray scaling. Thus, a user may easily move the slide switch key solely by the index finger and need not use wrist or arm action which could subject the stylus to unwanted movement.

Although the invention has been described with reference to presently preferred embodiments, it will be apparent to one skilled in the art that variations and modifications may be made within the spirit and scope of the invention. For example, as discussed above, the slide switch may be constituted by other than a resistive element, and the movable element may be mounted in other ways, and parameters other than those mentioned may be controlled. Also, the stylus may be used in different type digitizers and other electrovideographic devices, e.g., electromagnetic, capacitance, magnetostrictive, resistive, optical, sonic, CRT, light pen, etc. It is to be understood that the drawings and description of the preferred embodiments are made by way of example rather than to limit the scope of the invention, and it is intended to cover within the spirit and scope of the invention all such changes and modifications.

What is claimed is:

1. In a stylus for use with digitizer apparatus, said stylus having an elongated housing, means for interacting with the digitizer apparatus such that the digitizer apparatus may generate X/Y location data of said stylus relative to the digitizer apparatus and means for generating a Z-axis signal, the improvement comprising said means for generating said Z-axis signal comprising a device mounted to said housing, said device having a movable element accessible and manually engagable from a side of said housing and manually movable along said side of said housing, said device generating said Z-axis signal in relation to movement of said movable element along said side of said housing, said device being configured such that said movable element retains the position it is moved to after release thereof.

2. The stylus of claim 1, wherein said device provides a said Z-axis signal which is linearly related to the position of said movable element relative to said side of said housing.

3. In a stylus for use with digitizer apparatus, said stylus having an elongated housing, means for interacting with the digitizer apparatus such that the digitizer apparatus may generate X/Y location data of said stylus relative to the digitizer apparatus and means for generating a Z-axis signal, the improvement comprising said means for generating said Z-axis signal comprising a device mounted to said housing, said device having a movable element accessible and manually engagable from a side of said housing and manually movable along said side of said housing, said device generating said Z-axis signal in relation to movement of said movable element along said side of said housing, said device being configured such that said movable element is movable along said housing side parallel to a longitudinal axis of said housing.

4. The stylus of claim 3, wherein said movable element is resiliently biased substantially normal to said axis.

5. The stylus of claim 3, wherein said device provides an output which is linearly related to the distance parallel to said axis over which said movable element moves.

6. The stylus of claim 3, wherein said device comprises a bifurcated resistive strip having two legs, and said movable element comprises a contact portion bridging the two legs of the resistive strip.

7. The stylus of claim 3, further comprising an on-off switch connected to control outputting by said stylus of said Z-axis signal.

8. A stylus for use with a position determining device, said stylus having a housing, means for interacting with the position determining device such that the position determining device may determine the position of the stylus relative to the position determining device and means for generating a Z-axis signal comprising a movable element accessible and manually engageable from a side of said housing and manually movable along said side of said housing, said means for generating said Z-axis signal in relation to movement of said movable element along said side of said housing, said means for generating being configured such that said movable element retains the position it is moved to upon release thereof.

9. The stylus of claim 8, wherein said means for generating provides a said Z-axis signal which is linearly related to the position of said movable element relative to said side of said housing.

10. The stylus of claim 8, wherein said housing is elongated and has a longitudinal axis and said means for generating is configured such that said movable element is movable along said housing side parallel to said longitudinal axis of said housing.

11. The stylus of claim 10, wherein said means for generating provides an output which is linearly related to the distance parallel to said axis over which said movable element moves.

12. The stylus of claim 8, wherein said movable element is resiliently biased substantially normal to said axis.

13. The stylus of claim 8, wherein said means for generating comprises a bifurcated resistive strip having two legs, and said movable element comprises a contact portion bridging the two legs of the resistive strip.

14. The stylus of claim 8, further comprising an on-off switch connected to control outputting by said stylus of said Z-axis signal.

* * * * *